US008065260B2

(12) United States Patent
Herre et al.

(10) Patent No.: US 8,065,260 B2
(45) Date of Patent: Nov. 22, 2011

(54) DEVICE AND METHOD FOR ANALYZING AN INFORMATION SIGNAL

(76) Inventors: Juergen Herre, Buckenhof (DE); Eric Allamanche, Emeryville, CA (US); Oliver Hellmuth, Erlangen (DE); Thorsten Kastner, Stockheim (DE)

( * ) Notice: Subject to any disclaimer, the term of this patent is extended or adjusted under 35 U.S.C. 154(b) by 1416 days.

(21) Appl. No.: 11/557,023

(22) Filed: Nov. 6, 2006

(65) Prior Publication Data

US 2007/0127717 A1 Jun. 7, 2007

Related U.S. Application Data

(63) Continuation of application No. PCT/EP2005/005004, filed on May 9, 2005.

(30) Foreign Application Priority Data

May 10, 2004 (DE) ........................ 10 2004 023 436

(51) Int. Cl.
*G06F 9/44* (2006.01)
*G06N 7/02* (2006.01)
*G06N 7/06* (2006.01)

(52) U.S. Cl. ........................................................ 706/52

(58) Field of Classification Search ..................... 706/52
See application file for complete search history.

(56) References Cited

U.S. PATENT DOCUMENTS 6,597,802 B1 * 7/2003 Bolle et al. .................... 382/124
7,460,994 B2 * 12/2008 Herre et al. ................... 704/231
7,574,313 B2 * 8/2009 Disch et al. ..................... 702/77
7,580,832 B2 * 8/2009 Allamanche et al. ......... 704/205
7,676,336 B2 * 3/2010 Herre et al. ..................... 702/77

FOREIGN PATENT DOCUMENTS

DE 101 29 635 6/2001
WO WO 01/04870 1/2001
WO WO 02/11123 2/2002

OTHER PUBLICATIONS

Fingerprint Liveness Detection Using Local Ridge Frequencies and Multiresolution Texture Analysis Techniques, Abhyankar, A.; Schuckers, S.; Image Processing, 2006 IEEE International Conference on Digital Object Identifier: 10.1109/ICIP.2006.313158 Publication Year: 2006 , pp. 321-324.*

(Continued)

*Primary Examiner* — Michael B Holmes
(74) *Attorney, Agent, or Firm* — Michael A. Glenn; Glenn Patent Group

(57) ABSTRACT

For analyzing an information signal having a sequence of blocks of information units, wherein a plurality of consecutive blocks of the sequence of blocks represents an information entity, using a sequence of fingerprints for the sequence of blocks, identification results are provided for consecutive fingerprints, wherein an identification result represents an association of a block of information units with a predetermined information entity. Then at least two hypotheses are formed from the identification results for the consecutive fingerprints, wherein a first hypothesis is an assumption for the association of the sequence of blocks with a first information entity, and wherein the second hypothesis is an assumption for the association of the sequence of blocks with the second information entity. Then various hypotheses are examined to obtain an examination result on the basis of which there is then made a statement on the information signal. This achieves a meaningful and reliable time-continuous analysis of an information signal.

21 Claims, 7 Drawing Sheets

OTHER PUBLICATIONS

Dots and Incipients: Extended Features for Partial Fingerprint Matching, Yi Chen; Jain, A.K.; Biometrics Symposium, 2007 Digital Object Identifier: 10.1109/BCC.2007.4430538 Publication Year: 2007 , pp. 1-6.*
A hybrid method for fingerprint image quality calculation, Qi, J.; Abdurrachim, D.; Li, D.; Kunieda, H.; Automatic Identification Advanced Technologies, 2005. Fourth IEEE Workshop on Digital Object Identifier: 10.1109/AUTOID.2005.3 Publication Year: 2005 , pp. 124-129.*
On orientation and anisotropy estimation for online fingerprint authentication, Xudong Jiang; Signal Processing, IEEE Transactions on vol. 53 , Issue: 10 , Part: 2 Digital Object Identifier: 10.1109/TSP.2005.855417 Publication Year: 2005 , pp. 4038-4049.*
Batlle, E., et al. Automatic Song Identification in Noisy Broadcast Audio. XP-002337265. Proceedings of the Fourth lasted International Conference Signal and Image Processing ACTA Press Anaheim, California.
Chai, W., et al. Folk Music Classification Using Hidden Markov Models. XP-002337266.
Wang, A. Invited Talk. An Industrial-Strength Audio Search Algorithm. ISMIR 2003. Baltimore. Oct. 2003.
Haitsma, J., et al. Robust Audio Hashing for Content Identification.

* cited by examiner

| | $\Delta t_1$ | | $\Delta t_2$ | | $\Delta t_3$ | | $\Delta t_4$ | | $\Delta t_5$ | | $\Delta t_6$ | | $\Delta t_7$ | | $\Delta t_8$ | |
|---|---|---|---|---|---|---|---|---|---|---|---|---|---|---|---|---|
| | FA1 | | FA2 | | FA3 | | FA4 | | FA5 | | FA6 | | FA7 | | FA8 | |
| | ID1 | 40% | ID1 | 60 | ID1 | 80 | ID1 | 60 | ID1 | 90 | ID1 | 90 | ID 108 | 90 | ID 108 | 80 |
| | ID2 | 60 | ID2 | 70 | ID2 | 30 | ID2 | 40 | ID2 | 20 | ID2 | 10 | ID 109 | 85 | ID 109 | 70 |
| | ID3 | 30 | ID3 | 20 | ID3 | 30 | ID3 | 40 | ID3 | 10 | ID3 | 5 | ID 4 | 10 | ID 8 | 10 |
| H1 | ID1 | | ID1 | | ID1 | | ID1 | | ID1 | | ID1 | | ID108 | | ID108 | |
| H2 | ID2 | | ID2 | | ID2 | | ID2 | | ID2 | | ID2 | | ID109 | | ID109 | |
| H3 | ID3 | | ID3 | | ID3 | | ID3 | | ID3 | | ID3 | | ID4 | | ID4 | |
| H4 | | | | | | | | | | | | | | | ID8 | |

music piece transition for $\Delta t_1 - \Delta t_6$ $\Sigma$ ID1: 420

$\Sigma$ ID2: 230

$\Sigma$ ID3: 135

⟹ statement:
- information entity from $\Delta t_1 - \Delta t_6$ is piece of music ID1; H1 was correct; and/or
- $\Delta t_6$ is the end of the first information entity and $\Delta t_7$ is the beginning of the second information entity, respectively; and/or
- ID1 is included in information signal

FIGURE 3

ID 108 is a long version of a piece of music XY (length e.g. 7:32), symbolically represented by the following fingerprint:
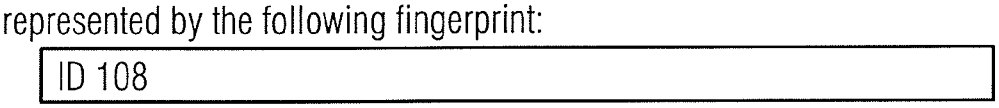
FIGURE 4A
ID109 is a short version of the same piece of music XY (e.g. a so-called "radio version" or "radio edit", length e.g. 4:38), symbolically represented by the following fingerprint:
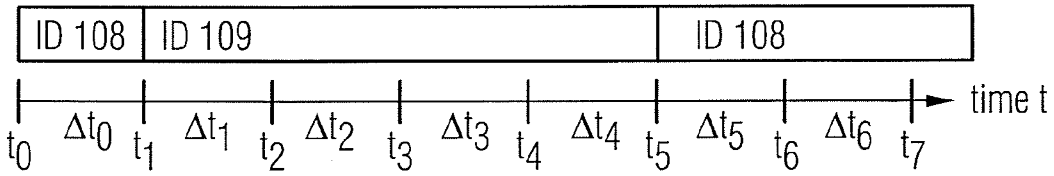
FIGURE 4C identified elements for the time periods $\Delta t_x$ (with x=0,1,2,3,4,5,6)

| ID 108 | ID 109 | ID 108 | ID 109 | ID 109 | ID 108 | ID 108 |
|---|---|---|---|---|---|---|
| $\Delta t_0$ | $\Delta t_1$ | $\Delta t_2$ | $\Delta t_3$ | $\Delta t_4$ | $\Delta t_5$ | $\Delta t_6$ |

FIGURE 5A combination in the recognition protocol:

1. $t_0$ to $t_1$: ID 108 ($\Delta t_0$)
2. $t_1$ to $t_2$: ID 109 ($\Delta t_1$)
3. $t_2$ to $t_3$: ID 108 ($\Delta t_2$)
4. $t_3$ to $t_5$: ID 109 ($\Delta t_3$, $\Delta t_4$)
5. $t_5$ to $t_7$: ID 108 ($\Delta t_5$, $\Delta t_6$)

FIGURE 5B identified elements for the time periods $\Delta t_x$ (with x=0,1,2,3,4,5,6)

| | | | | | | |
|---|---|---|---|---|---|---|
| ID 108 | ID 109 | ID 109 | ID 109 | ID 109 | ID 108 | ID 108 |

FIGURE 5C combination in the recognition protocol:

1. $t_0$ to $t_1$: ID 108 ($\Delta t_0$)
2. $t_1$ to $t_5$: ID 109 ($\Delta t_1$-$\Delta t_4$)
3. $t_5$ to $t_7$: ID 108 ($\Delta t_5$-$\Delta t_6$)

FIGURE 5D

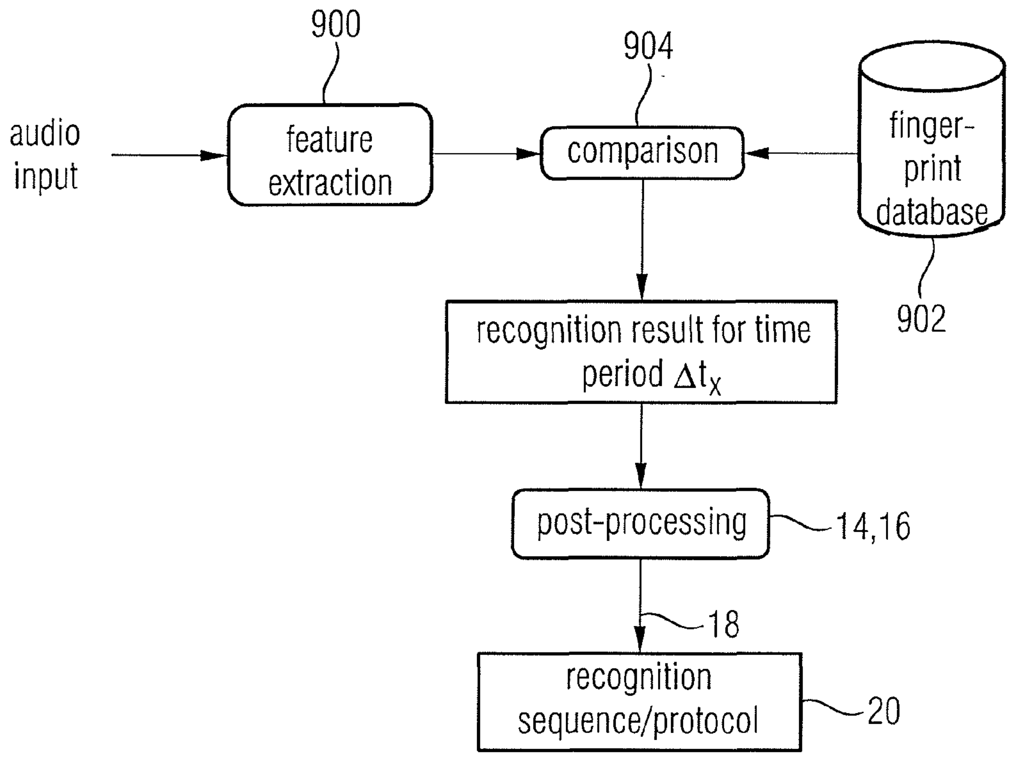
FIGURE 6
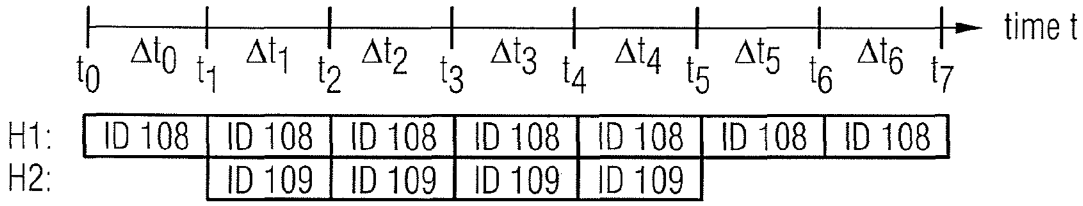
FIGURE 7A
hypothesis 1 (H1): $t_0$ to $t_7$: ID 108, confidence measure $x_{H1}$%
hypothesis 2 (H2): $t_1$ to $t_5$: ID 109, confidence measure $x_{H2}$%
with $x_{H1}\% > x_{H2}\%$, wherein $x_{H1}$% and $x_{H2}$% are each a function of the confidence measures of the individual recognitions.
FIGURE 7B
for the recognition protocol, this means:
1. $t_0$ to $t_7$: ID 108 ($\Delta t_0$-$\Delta t_6$)
FIGURE 7C

DEVICE AND METHOD FOR ANALYZING AN INFORMATION SIGNAL

CROSS-REFERENCE TO RELATED APPLICATION

This application is a continuation of copending International Application No. PCT/EP2005/005004, filed on May 9, 2005, which designated the United States and was not published in English.

BACKGROUND OF THE INVENTION

1. Field of the Invention

The present invention relates to signal analysis and particularly to signal analysis for the purpose of identification of signal content.

2. Description of the Related Art

In order to archive the ever increasing stock of audio and video material, establish databases that are easy to search or distribute them via various ways of distribution, automatic information recognition systems are necessary that assist to identify audio and video material or, more generally, information material unambiguously based on the contents.

One application for this is the so-called "broadcast monitoring". With the help of such an audio-video monitoring system, it is for example intended to ensure that only legal contents are distributed or that the respective royalties for the right holders of the audio and video material are paid correctly.

A further application is, for example, the recognition of audio material that is to be exchanged between partners via peer-to-peer networks.

A further application is the monitoring possibility for the advertising industry to monitor a television or radio station as to whether the booked advertising times have really been broadcast, or whether only parts of the booked advertising share have been broadcast, or whether parts of the commercials have been disturbed during transmission, which may, for example, be the responsibility of the television or radio station. At this point, it is to be noted that particularly the costs for television commercials in popular programs at good broadcasting times are so high that the advertising industry, particularly in view of these high costs, has a vital interest in a monitoring possibility, so that they do not merely have to trust the word of the broadcasting stations. Currently, the monitoring possibility is based on paid "test hearers" or "test viewers", who continuously watch a certain television program and record, for example, the exact times at which a commercial is transmitted, and who further monitor whether, during the transmission, there has been no disturbance, or whether the whole commercial has been transmitted correctly, i.e. whether there has been no picture distortion, etc.

The disadvantages of this concept are evident. On the one hand, the costs are significant and, on the other hand, the reliability or strength of evidence of statements of test hearers and/or test viewers is problematic, particularly if considerable repayment demands are made that solely depend on test watchers with regard to their provability.

Various known systems may be used for automated broadcast monitoring. For example, WO 02/11123 A2 or the specialist publication: "Invited Talk: An Industrial-Strength Audio Search Algorithm", Avery Wang, ISMIR 2003, Baltimore, October 2003, disclose systems and methods for recognizing audio and music signals in an environment of strong noise and high distortions. A first step is an examination whether there is a match between hash values of a reference audio object and the currently determined hash value of the audio object still unidentified. If this is the case, the associated time offset, i.e. the relative distance from the beginning of the audio object, of the hash value in the still unidentified audio object and the time offset of the hash value in the reference audio object is stored under the respective identification of the reference audio object. When all input hash values have been processed, a so-called scanning phase starts. During this phase, there is an examination of how many time offset pairs per reference audio object time match continuously. If a certain number is detected, an identification of the corresponding reference audio object is assumed. The time offset pairs are considered to be continuous in time, i.e. temporally associated with each other, when they form a straight line in a two-dimensional scatter plot with one time offset as the x-coordinate and the other one as the y-coordinate.

In the specialist publication "Robust Audio Hashing for Content Identification" by J. Haitsma, T. Kalker, J. Oostveen, in Proceedings of the Content-Based Multimedia Indexing, 2001, url:citeseer.ist.psu.edu/haitsma01robust. html, a system for robust audio hashing for content identification is presented. For content-based music recognition, a hash function is used that associates a bit sequence with a portion from an audio signal, namely such that audio signals acoustically similar for the human sound perception also generate a similar bit sequence. For the calculation of a hash value, the audio signal is first windowed and subjected to a transform to finally perform a division of the transform result into frequency bands with logarithmic bandwidth. For these frequency bands, the signs of the differences in the time and frequency directions are determined. The bit sequence resulting from the signs constitutes the hash value. One hash value is always calculated for an audio signal length of 3 seconds. If the Hamming distance between a reference hash value and a test hash value to be examined for such a portion is below a threshold s, a match is assumed and the test portion is associated with the reference element.

In order to perform a recognition of audio material, the audio signal is typically split into small units of length $\Delta t$. These individual units are each analyzed individually to have at least a certain time resolution.

This causes several problems.

The recognition results of the small analyzed time periods of the audio signal have to be put together so that an unambiguous correct statement on the recognized audio signal can be made for a longer time period.

For the analysis of a continuous audio data stream, transitions from one audio element to another, i.e. a transition from a piece of music A to a piece of music B, should be detected correctly.

There is further the situation in which there are several versions of a piece of music, which, for example, have the same beginning and only start to differ after a certain time. Just think of, for example, short versions or maxi versions of a song. Alternatively, there are also situations in which pieces of music that are based on the same song differ, for example, at the beginning, have an identical middle part and again differ from each other towards the end of at least one of the two pieces of music. For the payment of royalties to copyright holders, it may be important, whether, for example, the maxi version of a song may be played for a higher charge, whether only a normal version may be played for a medium charge, or whether, for a low charge, there may already be played the short version of a song. In this case, it should be possible to reliably distinguish several versions of a song.

The above prior art is unsatisfactory in that it results in detection errors when the results of the individual recognitions are simply put together. In particular, no information is given as to whether and how a continuous audio data stream from several different audio objects may be analyzed, and how corresponding transitions between various audio objects may be detected. In addition, although particularly in the latter prior art the ambiguity of reference hash values is mentioned, no explicit solution for the problem of the determination of an unambiguous candidate is given. If an audio object is considered to be identified for a hash value, for the directly subsequent hash value there is only an examination whether it fits the identified audio object. If this is not the case, there is a new search including all reference audio objects.

Particularly for distinguishing different versions of one and the same song, no solution is known in prior art.

SUMMARY OF THE INVENTION

It is the object of the present invention to provide a reliable concept for analyzing an information signal.

In accordance with a first aspect, the present invention provides a device for analyzing an information signal having a sequence of blocks of information units, wherein a plurality of consecutive blocks of the sequence of blocks represents an information entity, using a sequence of fingerprints for the sequence of blocks so that the sequence of blocks is represented by the sequence of fingerprints, having a unit for providing identification results for consecutive fingerprints, wherein an identification result represents an association of a block of information units with a predetermined information entity, and wherein there is a reliability measure for each identification result, wherein the unit for providing is designed to generate a first identification result for a first fingerprint, and to generate a second identification result differing from the first identification result for a following block; a unit for forming at least two hypotheses from the identification results for the consecutive fingerprints, wherein a first hypothesis is an assumption for the association of the sequence of blocks with a first information entity, and wherein a second hypothesis is an assumption for the association of the sequence of blocks with a second information entity, wherein the unit for forming is designed to start the first hypothesis or continue the already existing first hypothesis in response to the first identification result and to start the second hypothesis or to continue the already existing second hypothesis in response to the second identification result; a unit for examining the at least two hypotheses by combining the reliability measures of the hypotheses to obtain an examination result; and a unit for making a statement on the information signal based on the examination result.

In accordance with a second aspect, the present invention provides a method for analyzing an information signal having a sequence of blocks of information units, wherein a plurality of consecutive blocks of the sequence of blocks represents an information entity, using a sequence of fingerprints for the sequence of blocks so that the sequence of blocks is represented by the sequence of fingerprints, having the steps of providing identification results for consecutive fingerprints, wherein an identification result represents an association of a block of information units with a predetermined information entity, and wherein there is a reliability measure for each identification result, wherein, in the step of providing, a first identification result is generated for a first fingerprint and a second identification result differing from the first identification result is generated for a following block; forming at least two hypotheses from the identification results for the consecutive fingerprints, wherein a first hypothesis is an assumption for the association of the sequence of blocks with a first information entity, and wherein the second hypothesis is an assumption for an association of the sequence of blocks with a second information entity, wherein the step of forming includes starting the first hypothesis or continuing the already existing first hypothesis in response to the first identification result, and starting the second hypothesis or continuing the already existing second hypothesis in response to the second identification result; examining the at least two hypotheses by combining the reliability measures of the hypotheses to obtain an examination result; and making a statement on the information signal based on the examination result.

In accordance with a third aspect, the present invention provides a computer program having a program code for performing the above-mentioned method, when the program runs on a computer.

The present invention is based on the finding that a reliable content identification is achieved by not only considering individual recognition results by themselves, but over a certain period of time. For example, there is considerable information usable for recognition in the sequence of individual recognition results for a sequence of fingerprints. According to the invention, a formation of at least two different hypotheses is performed based on a sequence of fingerprints representing a sequence of blocks of an information signal, wherein a first hypothesis is an assumption for the association of the sequence of blocks with a first information entity, and wherein the second hypothesis is an assumption for the association of the sequence of blocks with the second information entity. The at least two hypotheses are now examined and subjected to an evaluation so that a statement on the information signal is made based on an examination result. The statement could, for example, consist in determining that the sequence of blocks represents an information entity having a hypothesis that is most likely. The statement could alternatively or additionally be that an information unit ends with the fingerprint that contributes to the most likely hypothesis as temporally last fingerprint of the sequence of fingerprints.

Preferably, the hypotheses are examined so that there are at least two different identification results for fingerprints, and that there is a reliability measure for each of the two different identification results, wherein this reliability measure may consist in a concrete number. This reliability measure, however, may also be given implicitly so that only by the fact that, for example, two identification results are provided, a reliability of, for example, ½ is signaled, and that this number is not given explicitly.

For the assessment whether a hypothesis is more likely than the other hypothesis, reliability measures of the individual recognitions for the respective number of blocks consecutive in time are advantageously combined, wherein this combination preferably consists in an addition. Then the hypothesis providing the highest combined reliability measure is evaluated to be the most likely hypothesis.

In a preferred embodiment of the present invention, a fingerprint database in which a number of reference fingerprints is respectively filed in association with an identification result is used as means for providing consecutive identification results. Then a database search is made with the fingerprint generated from a block of the information signal to be analyzed to look for a reference fingerprint providing a match with the test fingerprint within the database. Depending on the design of the database, only the best hit, i.e. the hit with a minimum distance measure, is output as search result by the database as identification result. Also, databases are preferred that provide a hit result not only qualitatively, but also provide a quantitative hit result, so that a number of possible hits with an associated reliability measure is output, so that, for example, all hits with a reliability measure larger than or equal to a certain threshold, such as 20%, are output by the database.

In the preferred embodiment of the present invention, a new hypothesis is started when a new identification result appears for which there is no hypothesis yet. This procedure is performed for a certain number of blocks to then examine directed into the past whether a certain hypothesis that has been found reliable has already ended, to then identify this hypothesis as the most likely hypothesis.

An advantage of the present invention is that the concept works reliably and is nevertheless error-tolerant particularly regarding transmission errors. For example, no attempt is made to make a decision based on a single block, but a sequence of consecutive blocks is, as it were, considered and evaluated together by hypothesis formation, so that short-term transmission disturbances and/or generally occurring noise do not make the whole recognition process useless.

In addition, the inventive concept automatically provides recording of the transmission quality from the beginning to the end, for example of a commercial. Even if a hypothesis has been identified as the most likely hypothesis, i.e. if a certain commercial is determined to have been there, quality variations within the commercial are still traceable based on the reliability measures. Furthermore, in that way particularly the complete time continuity of a commercial as an example of an information entity is traceable and recordable, particularly with respect to the aspect that they did not continuously repeat a part of the commercial, but that the whole commercial was transmitted from the beginning of the commercial to the end of the commercial in a continuous way.

The present invention is further advantageous in that, by hypothesis formation, the end of an information entity and the beginning of an information entity are automatically detected. This is due to the fact that an association with an information entity will generally be unambiguous. This means that it is not possible to replay several information entities together over a certain point in time, but that, at least for the excessive number of program contents, only one information entity is contained in the information signal at one point in time. The hypothesis examination and the evaluation of the hypotheses based on the hypothesis examination automatically provides a point in time at which a previous information entity ends and at which a new information entity starts. This is due to the block association maintained in the hypotheses. Thus a sequence of fingerprints still corresponds to a sequence of blocks and, in turn, a sequence of identification results corresponds to a sequence of fingerprints, so that a hypothesis is unambiguously associated with the original information signal with respect to time.

The inventive concept is further advantageous in that there are no "draw" situations between two hypotheses, even if information entities partially have identical audio material, such as short versions or long versions of one and the same song.

BRIEF DESCRIPTION OF THE DRAWINGS

Preferred embodiments of the present invention will be explained in detail below with respect to the accompanying drawings, in which:

FIG. 3 is a schematic representation of an output result for a sequence of fingerprints for a sequence of time intervals as well as the associated hypotheses;

FIGS. 4*a*-4*c* show an exemplary scenario for subsequent examples of application;

FIGS. 5*a*-5*d* show a schematic representation of various wrong evaluations;

FIG. 6 is a block circuit diagram of a preferred embodiment of the present invention;

FIGS. 7*a*-7*c* show a representation of the functionality of the inventive concept for the output scenario illustrated in FIGS. 4*a*-4*c;*

DESCRIPTION OF THE PREFERRED EMBODIMENTS

Figure 1:
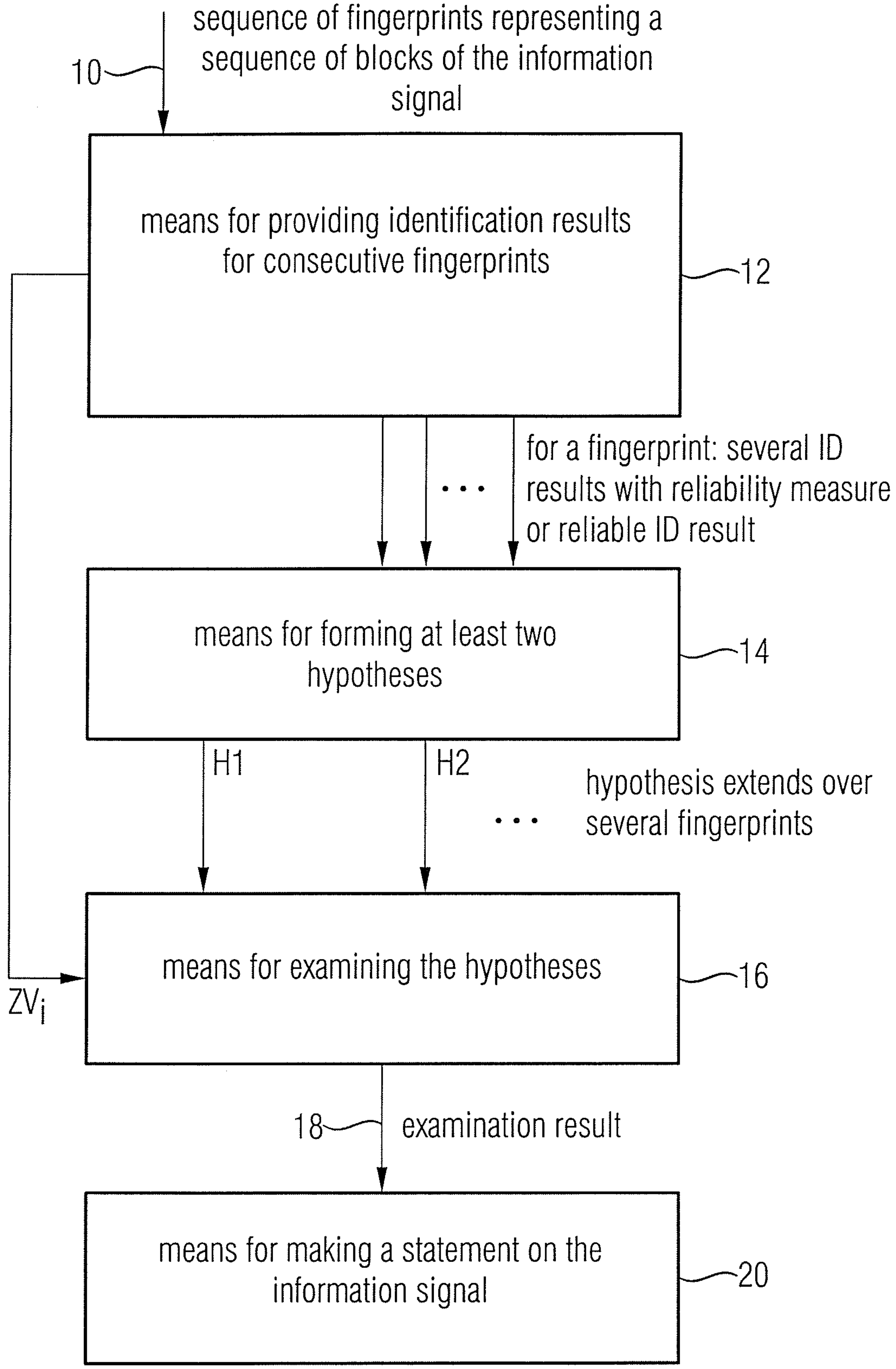
FIG. 1 is a block circuit diagram of an inventive device.
Figure 8:
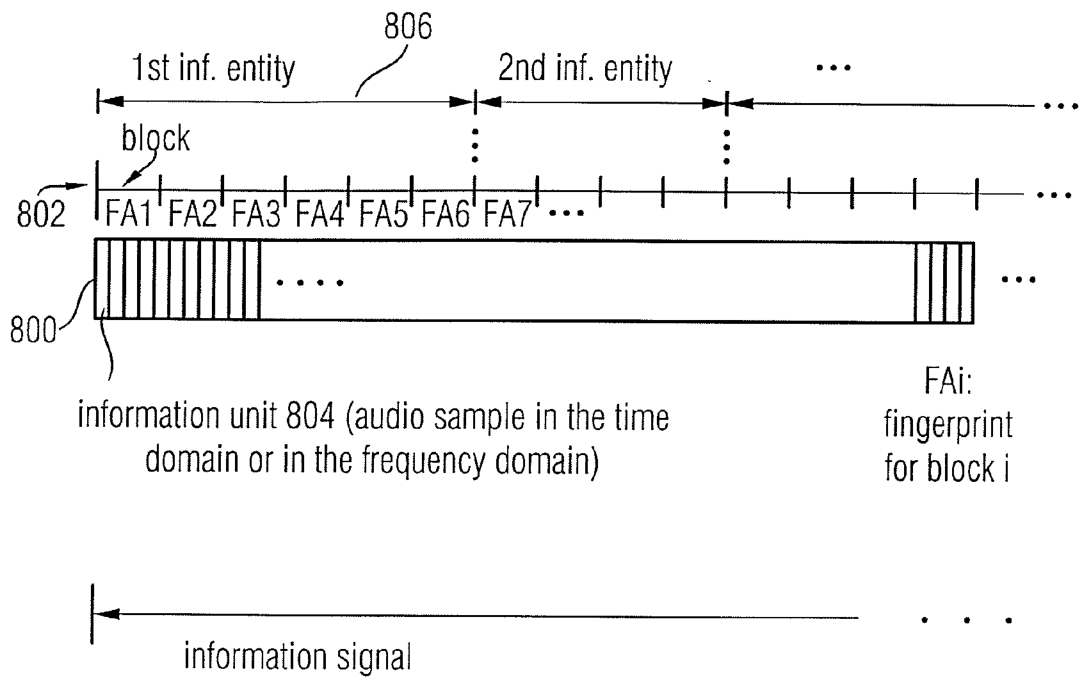
FIG. 8 is a schematic representation of an information signal with information units, blocks of information units and information entities with a plurality of blocks.

FIG. 1 shows a block circuit diagram of a device for analyzing an information signal according to a preferred embodiment of the present invention. An exemplary information signal is indicated at 800 in FIG. 8. The information signal 800 consists of a sequence 802 of blocks of information units consecutive in time, wherein the individual information units 804 may be, for example, audio samples, video pixels or video transform coefficients, etc. A plurality of blocks of the sequence 802 together always form an information entity 806. In the embodiment shown in FIG. 8, the first six blocks form the first information entity, and the blocks 7, 8, 9, 10 form the second information entity. Starting from the blocks 11 to n, a third information entity is, for example, illustrated in FIG. 8. An information entity could, for example, be a piece of music, a spoken passage, a video image or, for example, also part of a video image. An information entity could, however, also be a text or, for example, a page of a text, if the information signal also includes text data.

The device shown in FIG. 1 is designed to operate using a sequence of fingerprints FA1, FA2, FA3, . . . , FAi, which are generated from the sequence of blocks 802 or which are fetched, for example, from a memory, if the fingerprints have already been generated prior to the analysis or are perhaps even supplied with the information signal, depending on the implementation. It is to be noted that there may also be used block overlapping techniques for the block formation, as they are known, for example, from audio coding.

In any case, the device for analyzing the information signal operates using a sequence of fingerprints for the sequence of blocks, so that the sequence of blocks 802 is represented by the sequence of fingerprints FA1, FA2, FA3, FA4, . . . , FAi. The sequence of fingerprints is fed into a fingerprint input in means 12 for providing identification results for consecutive fingerprints. The means 12 for providing consecutive identification results is operative to provide consecutive identification results for the consecutive fingerprints, wherein an identification result represents an association of a block of information units with a predetermined information entity. Assuming, for example, that a song has a time length corresponding to about six blocks, the six blocks provide different fingerprints, but in the means 12 for providing all these six blocks are signaled to be part of the predetermined information entity, i.e. the mentioned song.

Depending on the implementation, the means 12 for providing will provide one or more identification results for a fingerprint. The one or more identification results are supplied to means 14 for forming at least two hypotheses from the identification results for the consecutive fingerprints. Specifically, a first hypothesis represents an assumption for the association of the sequence of blocks with a first information entity, and the second hypothesis is an assumption for the association of the sequence of blocks with the second information entity. The various hypotheses H1, H2, . . . are supplied to means 16 for examining the hypotheses, wherein the means 16 is designed to operate according to an adjustable examination algorithm to finally provide an examination result at an examination result output 18.

This examination result on line 18 is then provided to means 20 for making a statement on the information signal. The means 20 for making a statement on the information signal is designed to output information on the information signal based on the examination result, and may have various settings.

All settings have in common that the statement on the information signal is made on the basis of the examination result 18. Examples of various statements on the information signal consist in determining that the sequence of blocks represents an information entity having a hypothesis that is most likely. Alternative statements are that an information entity ends with the fingerprint that contributes to the most likely hypothesis as the timewise last fingerprint. An alternative statement that may be made by the means 20 consists in determining that an information entity per se is present in the information signal or not.

The inventive post-processing particularly provided by the means 14, 16 and 20, i.e. forming at least two hypotheses, examining the hypotheses and making a statement on the basis of an examination result, thus not only allows the identification of a piece in an information signal that is unknown, i.e. to be analyzed, but—apart from the identification of a piece itself—also allows the detection of the end of a first piece, i.e. a first information entity, and the detection of the beginning of a second information entity following the first information entity.

Regarding commercial monitoring, the inventive post-processing concept, however, also provides the possibility to detect whether a certain piece was present in the information signal or not. The fingerprints acquired from the information signal would here only be compared to one set of fingerprints, namely the set of fingerprints representing the predetermined information entity, i.e. a certain commercial. This statement is thus not primarily to be considered in the context of identifying an information entity or detecting the end of an information entity and the beginning of a following information entity, but consists in detecting whether a certain information entity is present in an unknown information signal to be analyzed or not.

Figure 2:
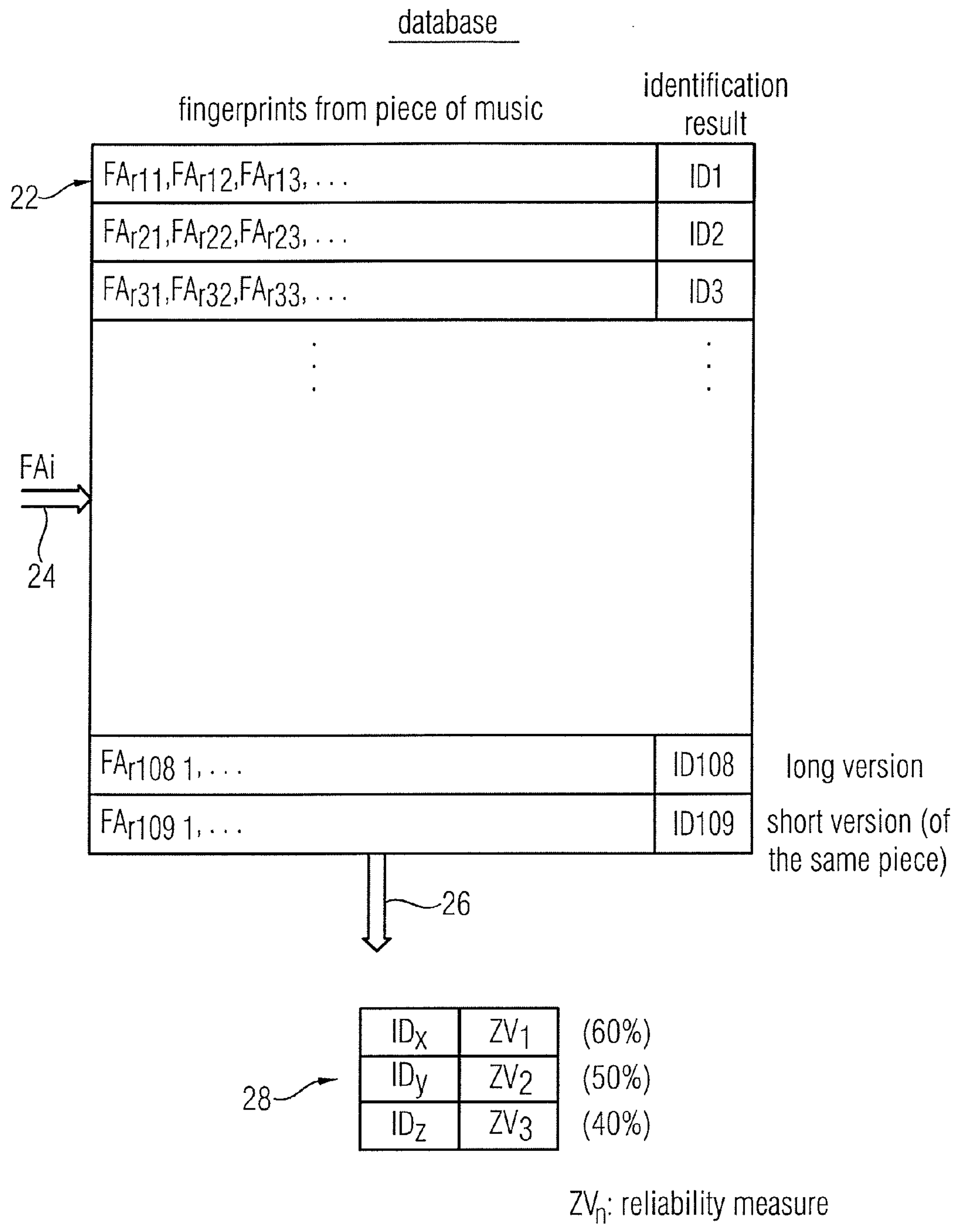
FIG. 2 is a block circuit diagram of a database usable for the embodiment shown in FIG. 1.

FIG. 2 shows a special preferred implementation of the means 12 for providing identification results for consecutive fingerprints. In a preferred embodiment, the means 12 includes a database including various reference fingerprints FArj, which are all stored in association with an identification result, i.e. IDk, as shown in FIG. 2. In the preferred embodiment, the fingerprints FAi are processed one after the other, i.e. sequentially in time. Thus a fingerprint FAi is stored into the database via an input line 24. In the database, the stored fingerprint FAi is then compared to all reference fingerprints FArj. In the preferred embodiment, the database is not a qualitative database that determines that an input fingerprint matches a stored reference fingerprint or not, but the database is a quantitative database that can provide a distance measure and/or a reliability measure for the output results. In the preferred embodiment shown in FIG. 2, the database 22 would thus provide, for example, the result illustrated in a result table 28 at its output 26. Thus the database would, for example, say that the fingerprint FAi indicates an identification result IDx, i.e. a piece of music, for example x, with a reliability $ZV_1$ of 60%. At the same time, however, the database will also say that the fingerprint FAi indicates a piece with the identification result IDy with a reliability of 50%. Finally, the database could also output that the fingerprint FAi indicates yet another piece with the identification IDz with a reliability measure ZV3 of, for example, 40%.

Depending on the implementation, the whole result table 28 may be supplied to the means 14 for forming at least two hypotheses of FIG. 1. Alternatively, however, the database 22 itself could already make a decision and always provide only the most likely value, i.e. in the present case the result IDx, to the means 14 for forming at least two hypotheses. In this case, the reliability measure ZV1 would not necessarily also have to be provided to the means 14 for forming at least two hypotheses. Instead, the further communication of the reliability measures ZVi could be omitted. Alternatively, however, the means 12 for providing the identification results, which at the same time also provides the reliability measures, could also be designed to provide the reliability measures ZVi in corresponding order in association with the blocks not to the means 14 for forming at least two hypotheses, but to the means 16 for examining the hypotheses, because this means 16 only needs the reliability measures to find, for example, the most likely hypothesis.

It can be seen from the database 22 in FIG. 2 that an identification result, such as ID1, may have several associated fingerprints FAr11, FAr12, FAr13, which indicates that the piece being identified by ID1 has several blocks. Depending on the implementation, however, there may also be stored a single long fingerprint for the piece with the identification ID1, which is, however, composed of the individual fingerprints FAr11, FAr12, FAr13, . . . . The database would then correlate the supplied fingerprint FAi, which depends on the block length and is typically much shorter than the long fingerprint, with the long fingerprint in each row of the database to determine whether or not a portion of the long stored reference fingerprint matches the reference fingerprint FAi supplied on line 24. Here, the reliability measure would result automatically, so to speak, i.e. simply by a quantitative evaluation of the correlation result.

Furthermore, reference is already made to the last two rows, based on FIG. 2, which are designated by the identification results ID108 and ID109. ID108 designates a long version of a piece of music, as will be explained with respect to FIG. 4*a*, while ID109 identifies a short version of the same piece of music, as shown in FIG. 4*b*.

As already discussed, the database 22, i.e. this implementation of the means 12 for providing identification results for consecutive fingerprints, may be designed such that it always supplies only the most likely identification result. Alternatively, however, the database 22 could also be defined to always supply, for example, only the identification results whose probability is higher than a minimum threshold, such as a threshold of 5%. This would have the result that the number of rows of the table varies from fingerprint to fingerprint. Again alternatively, the database 22 could, however, also be implemented to supply, for each input fingerprint FAi, a certain number of most likely candidates, such as the "top ten", i.e. the ten most likely candidates, to the means 14 for forming at least two hypotheses.

Subsequently, an implementation of the database 22 will be illustrated based on FIG. 3, in which the database always supplies the three most likely identification results together with the associated reliability values to the means 14 for forming hypotheses, i.e. it includes, so to speak, a "top three" implementation. FIG. 3 shows that, for fingerprint FA1, identification results ID1, ID2, ID3 are provided, actually with the respective reliability measures 40%, 60% or 30%. For the time interval Δt2, i.e. for the fingerprint FA2, there will again be a delivery of the identification results ID1, ID2, ID3, but now with a different respective probability, i.e. with a different respective reliability measure, which is illustrated in percent only as an example in FIG. 3. This procedure is performed for all input fingerprints FA1 to FA8. The means 14 for forming at least two hypotheses, as illustrated in FIG. 1, is provided with these identification results. The means 14 for forming at least two hypotheses is designed to start a new hypothesis whenever a new identification result is supplied from the means 12 for providing the identification results. This can be seen from FIG. 3, where the hypotheses H1, H2, H3 are started with ID1, ID2 and ID3, respectively, at time Δt1, and new hypotheses are again started with ID108, ID109, ID4 in the time interval Δt7, and a further hypothesis H4 is started for ID8 in time interval Δt8 due to the fact that ID8 appears there for the first time in the shown example.

The means 14 for forming at least two hypotheses is thus operative to see for each new fingerprint whether there will be a new identification result, to start a new hypothesis, and to continue a hypothesis already started earlier when, for a time period Δti, an element is included in the "top three" or "top x" for the hypothesis already started earlier that, although with less probability, provides an identification result for a hypothesis just started. This procedure is continued for a certain time. Then, for example at predetermined times or triggered by a user, etc., the means 16 for examining the hypotheses will examine the hypotheses formed for the past and, for the case shown in FIG. 3, add, for example, the reliability measures of the hypotheses H1, H2, H3 for the time periods Δt1 to Δt6. The means 16 for examining at least two hypotheses would then determine that the piece is most likely ID1, i.e. that the hypothesis H1 is the most likely hypothesis for the time period Δt1 to Δt6, because the reliability measure reaches a value of 420, while the second hypothesis only reaches a reliability measure of 230, and while the third hypothesis only reaches a reliability measure of 135.

In the case shown in FIG. 3, all three hypotheses start at the same time and all three hypotheses end at the same time. However, this does not necessarily have to be the case. For example, the hypothesis H1 could end earlier, i.e. for example at time Δt5. In this case, the reliability measure of ID1 would have to be reduced by 90, thus arriving at a value of 330. In this case, the result would be that the hypothesis H1 is nevertheless the most likely hypothesis, although hypothesis H2 is present over a longer time period, but all in all with less probability. The example shown in FIG. 3 further shows that the hypothesis H1 "wins" in the end in spite of the fact that it was less likely for Δt1 than the hypothesis H2.

FIG. 3 further shows that a hypothesis may also have "holes" such that, for example, for some reason, for example due to the disturbance of a transmission channel, etc., only ID2 and ID3, but not ID1, are supplied with reasonable probability in the time interval Δt4. In that case, the reliability value for ID1 would have to be reduced by 60, which would, in turn, have the result that the total reliability would be 360 instead of 420, so that the hypothesis H1 is the most likely hypothesis in this case as well.

The above scenarios thus show that the inventive concept, which works with hypotheses on the basis of post-processing and, on the one hand, considers the sequence and, on the other hand, the reliability measures of the individual fingerprint identification processes, is extraordinarily robust with respect to transmission errors and also with respect to problematic functionalities in the database or also with respect to fingerprints that may not differ as much as would be desirable for some information entities, such as pieces of music, video images, texts, etc.

In a preferred embodiment, a hypothesis is a stored protocol (FIG. 3: H1, H2, H3, . . . ), preferably in the form of a stored list, which on the one hand comprises an indication of the information entity for which the hypothesis is made and on the other hand an indication of fingerprints and/or blocks of information units for which the hypothesis is done. Preferably, the protocol also contains a reliability measure for a block and/or fingerprint.

FIG. 3 further shows that the first information entity only extends over the time period Δt1 to Δt6, and a new entity starts from Δt7. This may particularly also be seen from the fact that all three hypotheses end at the same time and/or that, even if the hypothesis H3 had, for example, included Δt7, now completely different identification values with a very high probability, namely ID108 and ID109 with probabilities of 90 and 85, appear and thus "replace" the "clear winners" from the previous time period.

At the end of FIG. 3, the various statements that may be made by way of example are represented, i.e. that the information entity in the time period Δt1 to Δt6 is the piece of music identified by ID1. Alternatively, the statement could also be that an information entity change occurs between Δt6 and Δt7. Alternatively, however, a statement could also be that the piece of music identified by ID1 is contained in the information signal.

Figure 9:
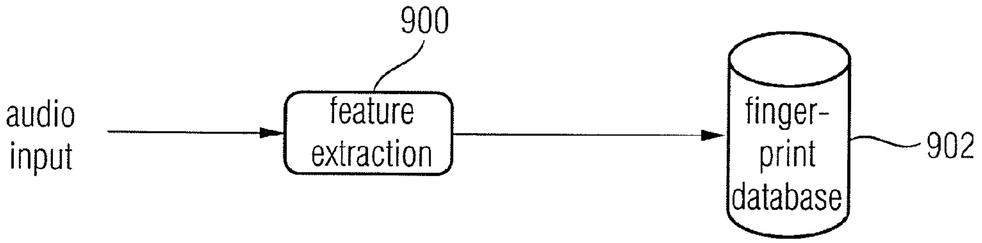
FIG. 9 is a known scenario for building up a fingerprint database.
Figure 10:
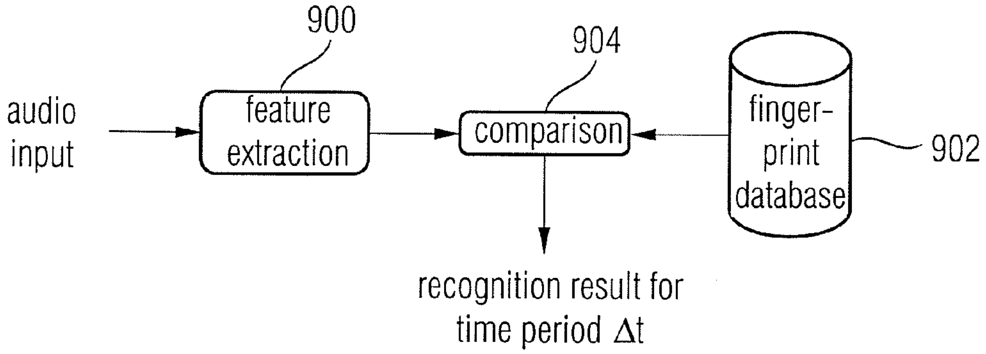
FIG. 10 is a known scenario for audio identifying by means of a fingerprint database loaded according to FIG. 9.

Next, there is first a more general discussion of database systems based on FIGS. 9 and 10, how they may be used advantageously in connection with the present invention. The present invention is thus based on a system for the identification of audio material, such as music. The system knows two operation phases. In the training phase, illustrated based on FIG. 9, the recognition system learns the pieces to be identified later on. In the identification phase, illustrated in FIG. 10, the previously trained audio pieces may be recognized.

In order to identify a piece of music—or also any other audio signal—, a compact and unique data set is extracted therefrom, also referred to as fingerprint or signature. This extraction is done in a block feature extraction 900. In the training or learning phase, such fingerprints are generated from a set of known audio objects and stored in a fingerprint database 902. Preferably, the feature extraction means 900 is designed to use the SFM feature as feature, wherein SFM means "spectral flatness measure". Of course, other fingerprint generation systems and/or feature extraction results may also be used. However, it has been found that tonality-related features and particularly the SFM feature have a particularly good distinctiveness on the one hand and a particularly good compactness on the other hand. For this purpose, each block is first subjected to a time/frequency conversion, to then calculate an SFM for a block with the values generated from the time/frequency conversion according to the following equation.

$$SFM = \frac{\left[\prod_{n=0}^{N-1} X(n)\right]^{\frac{1}{N}}}{\frac{1}{N}\sum_{n=0}^{N-1} X(n)}$$

In this equation, X(n) represents the square of an absolute value of a spectral component with the index n, wherein N is the total number of spectral coefficients of a spectrum. It may be seen from the equation that the SFM measure is equal to the quotient of the geometric mean of the spectral components and the arithmetic mean of the spectral components. It is known that the geometric mean is always less than or maximally equal to the arithmetic mean, so that the SFM has a value range between 0 and 1. In this context, a value close to 0 indicates a tonal signal, and a value close to 1 indicates a rather noise-like signal with a flat spectral curve. It is to be noted that the arithmetic mean and the geometric mean are only equal if all X(n) are identical, which corresponds to a completely atonal, i.e. noise-like or pulse-like signal. However, if in an extreme case only one spectral component has a very high value, while other spectral components X(n) have very small values, the SFM measure will have a value close to 0, indicating a very tonal signal.

The SFM concept as well as other feature extraction concepts to generate fingerprints are, for example, discussed in Wo 03/007185.

In the identification phase, illustrated in FIG. 10, there is typically also the same feature extraction 900 as in the training phase. Specifically, the fingerprint extracted from the audio object at the audio input for a time period Δt is compared to the reference fingerprints of the fingerprint database 902 by means of a comparator 904, wherein the comparator is typically included in the means 12 for providing identification results, as illustrated with respect to FIG. 1. Subsequently, a recognition result is obtained for the time period Δt in the case of the detection of a match based on a certain criterion. If thus a match is detected based on a certain criterion, the unknown fingerprint and thus the portion from the unknown audio object may be associated with reference material in the database, i.e. a list of identification results IDi, IDi+1, . . . , with various reliability values.

According to the invention, now an unknown audio object at the input is not only associated with exactly one reference audio object in the reference database, namely only for a time Δt, but there is a continuous operation without interruption of the data stream at the input. According to the invention, an association of various portions from audio objects with the correct audio objects from the reference database is performed. Thus an unbroken sequence, i.e. a protocol, of the identified audio objects at the input is obtained.

Next, a particular difficulty of the continuous analysis of a continuous audio data stream is represented based on FIGS. 4*a* to 5*d*. The audio object has to be divided into portions of length Δtx, i.e. into individual blocks, to be able to make an association with a reference element in the database for the portion of the audio data stream. It is possible that this association of an individual portion of the audio data stream is not always unambiguous and only becomes unambiguous in connection with preceding and following associations. If individual associations are made and they are only combined in a further step, the result are faulty recognition protocols, as shown below.

FIG. 4*a* represents a long version of a piece of music XY, which is also represented by a long fingerprint illustrated in FIG. 4*a*, wherein the identification result ID108 is associated with this fingerprint. FIG. 4*b* shows the same for a short version of the same piece of music XY. ID109 thus indicates a short version of the piece of music XY, while ID108 indicates a long version of this piece of music. Since the short version is shorter than the long version, the fingerprint in FIG. 4*b* is also shorter than the fingerprint in FIG. 4*a*. As the two blocks are illustrated one below the other, the pieces of music and thus also the fingerprints ID108 and ID109 contain identical audio material and/or identical fingerprint data. ID109 is thus a subset of ID108. FIG. 4*c* thus shows that the long version has a starting portion in the time period Δt0, which is not present in the short version. In the middle portion between t1 to t5, the long version and the short version are identical, while the long version again has a music portion not present in the short version identified by ID109 between the times t5 and t7.

Subsequently, there will be an illustration based on FIGS. 5*a* to 5*d* how faulty recognition protocols may be generated with the individual identifications in the case of simple combination, i.e. without hypothesis formation. It is assumed that the piece of music ID108 is received at the input of the system at time t0. Furthermore, let the database be operative to identify the elements shown in FIG. 5*a* for the time periods Δtx. It is to be noted that the identification in FIG. 5*a* is basically correct, although both ID108 and ID109 could be output in the time periods Δt1 to Δt4. Ultimately, the determination of the identification results in these areas is ambiguous, because the database will output both ID109 and ID108 in absence of a disturbance, and, due to computational differences, will, for example, always choose the most likely value, so that, due to some noise, one of the two identification results ID108 or ID109 will always have a slightly higher reliability measure. In the recognition protocol illustrated in FIG. 5*b*, a wrong identification is thus made in that the piece identified by ID109 has not been played at any time, but only the piece identified by ID108 has been played.

Subsequently, FIGS. 5*c* and 5*d* show a further alternative. It is assumed that the database outputs the situation shown in FIG. 5*c*. In the recognition protocol, there is again given a wrong combination, i.e. that ID109 was present between T1 and T5, while this, of course, is not the case. Instead, the long version of the piece of music, i.e. ID108, was played from $t_0$ to $t_7$.

In addition, further wrong recognition protocols are conceivable, which are generated by the ambiguity of the individual recognitions for a portion of the audio data stream in the time period Δtx.

According to the invention, the general concept illustrated in FIG. 6 is now accessed, wherein the recognition results obtained for a time period Δtx, i.e. the output signals of the means 12 of FIG. 1, which may combine the means 900, 904, 902 depending on the implementation, are subjected to post-processing substantially corresponding to the means for forming at least two hypotheses and the means for examining the hypotheses of FIG. 1. Then a statement on the information signal is made in the form of a recognition sequence and/or a recognition protocol using the post-processing, i.e. using the examination results obtained in the post-processing.

In the post-processing stage, the probability for the transition from an identified reference audio object for the time period Δtx to any other reference audio objects for the time period $\Delta t_{x+1}$ is assumed to be equal. From this assumption, various hypotheses, which are first considered in parallel, are formed for contiguous audio portions from the individual recognitions. It is to be noted that individual recognitions are combined to form a hypothesis when they are related to one and the same reference audio signal and are time-continuously connected. The recognition protocol results from a combination of the respective most likely hypotheses considering the progress in time. Subsequently, a preferred algorithm is illustrated in detail.

At first, various hypotheses for contiguous audio portions are formed from the individual recognitions for the time periods Δtx (wherein x=N, N+1, N+2, . . . ; wherein $t_N$ is the starting time for the respective hypothesis) for each recognized reference audio object.

Individual recognitions are combined to form a hypothesis, if the individual recognitions are consecutive in time in a continuous way.

The time continuity is a further element that serves to determine whether an already existing hypothesis is continued or whether a new hypothesis is started. Consider, for example, the scenario in which a certain guitar solo, for example, in a piece is situated rather at the beginning of the piece in the short version of the piece and is situated rather in the middle of the piece in a long version of the piece.

In a preferred embodiment, the database, i.e. the means for providing identification results, not only outputs a fingerprint identification, but also a time value which results from the identification fingerprint in the database having a length and the input (short) fingerprint only matching part of the (long) fingerprint in the database.

In the scenario described above, the database would perhaps provide two ID results for the guitar solo (short version and long version), but with two different time indices. The time index for the ID result for the short version is smaller than the time index for the long version. On the basis of the time index, the means for forming the hypotheses is now capable of continuing hypotheses (if there is time continuity between the time index and the last time index in the hypothesis) or starting new hypotheses, if there is no continuity in the currently obtained time index and a last time index of a hypothesis.

Each time discontinuity with respect to a reference audio object generates a new hypothesis, if the following element has a larger distance in time than a time distance Ta to be set, or if the following element is temporally before the previous one.

For the hypothesis examination, an addition of the confidence measures, i.e. the reliability values and/or the measures for the plausibility, of the individual recognitions is made for each hypothesis.

Starting with the time period Δt0, the hypothesis with the highest confidence measure is then evaluated to be true and adopted into the recognition protocol. For the next time period following the first hypothesis, the hypothesis with the highest confidence measure is again evaluated to be true and adopted into the recognition protocol, etc.

For the above example, the result is thus a process illustrated based on FIGS. 7*a* to 7*c*. For the time period Δt0, the database, as illustrated, for example, in FIG. 2, provides only one identification result, i.e. ID108, that has a probability and/or a reliability measure above a threshold. In the time interval Δt1, i.e. for the block of information units extending over the time interval Δt1, the database provides two results having a reliability measure that is above a threshold. The two results are also obtained for the blocks between the times t2 to t5. For the time period t5 to t7, the database then again provides only a single identification result whose reliability measure is above a threshold.

The means 14 (FIG. 1) for forming at least two hypotheses is designed to start a first hypothesis at the time to based on the identification result ID108, and to start a new hypothesis, i.e. the hypothesis H2, at the time t1 based on the new identification result ID109.

Some time after time $t_7$, the hypothesis situation shown in FIG. 7*a* with the hypotheses H1 and H2 is then considered to then calculate the functions for the confidence measures of the individual recognitions, i.e. $X_{H1}$ and $X_{H2}$, for each hypothesis based on the examination of the hypotheses, which may be done as illustrated in FIG. 7*b*.

Assuming that, between $t_1$, and $t_5$, the identification results ID108 and ID109 occur with the same probability, only the first hypothesis H1 will win in the embodiment shown in FIG. 7*a*, because although the hypothesis was just as likely as the hypothesis H2 between $t_1$, and $t_5$, the hypothesis H1 applies in the time period Δt0 and in the time period Δt5 and in the time period Δt6, i.e. it contributes a reliability measure for an individual recognition that is not given for the hypothesis H2. For the recognition protocol, this means the correct case shown in FIG. 7*c*, i.e. that the piece designated ID108 was played from time t0 to time t7.

Starting at $t_0$, the hypothesis H1 is thus chosen, because until t7 there is no hypothesis with a higher confidence measure. The hypothesis H2 is discarded, wherein, in principle, all hypotheses can be discarded that exist in parallel to another hypothesis that has been chosen as the most likely one.

According to the invention, there is thus recorded exactly the sequence, in this example an element, namely ID108, that was really played at the audio input.

It is to be noted that there are various possibilities for the determination of the end of a hypothesis. For example—independent of the hypothesis situation—an information entity end may be determined, for example, from the audio signal itself, for example if there is a pause with a certain minimum length. Since, however, this criterion does not work if there is fading between two information entities or if two pieces follow each other so quickly that no noticeable pause can be found, it is preferred to determine an information entity end based on the hypotheses considered in the past. This may be done, for example, such that a hypothesis is considered to have ended when, for example, two or more blocks that have no longer any identification result with a reliability value above a certain minimum threshold are provided to the means 14 for forming hypotheses. Alternatively, for example for the case shown in FIG. 3, there may simply be started to add the values of the hypotheses for a predetermined number of blocks at some time directed into the past in order to see which hypothesis had the highest value for certain blocks at the end, i.e. after a certain number of, for example, 20 blocks, and has thus survived and “outdone” the other hypotheses. In the example shown in FIG. 3, this would mean that the hypotheses that the information entity is ID1 or ID2 or ID3 would also be continued for the time periods Δt7 and Δt8, wherein, however, this would not change anything in the recognition of ID1, because new hypotheses, i.e. the hypothesis for ID108, ID109, ID4 and ID8, are started only substantially later, i.e. for blocks from Δt7 and Δt8 or above, and thus achieve such high combined reliability values only much later or not at all.

The above discussion shows that the end of a hypothesis does not necessarily have to be determined actively, but that this end may automatically result from the analysis of the past, i.e. the started hypotheses. Preferably, a new hypothesis is started whenever a new identification result with a reliability measure above a significance threshold appears, wherein then the past is examined at some time to see which hypothesis survives for a certain time period, wherein it is not necessary to explicitly determine an end of a hypothesis for this purpose, because it is an automatic result.

Depending on the circumstances, the inventive method may be implemented in hardware or in software. The implementation may be done on a digital storage medium, particularly a floppy disk or CD with control signals that may be read out electronically, which may cooperate with a programmable computer system so that the method is performed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for analyzing an information signal having a sequence of blocks of information units, wherein a plurality of consecutive blocks of the sequence of blocks represents an information entity, using a sequence of fingerprints for the sequence of blocks so that the sequence of blocks is represented by the sequence of fingerprints, comprising:

a unit for providing identification results for consecutive fingerprints, wherein an identification result represents an association of a block of information units with a predetermined information entity, and wherein there is a reliability measure for each identification result, wherein the unit for providing is designed to generate a first identification result for a first fingerprint, and to generate a second identification result differing from the first identification result for a following block;

a unit for forming at least two hypotheses from the identification results for the consecutive fingerprints, wherein a first hypothesis is an assumption for the association of the sequence of blocks with a first information entity, and wherein a second hypothesis is an assumption for the association of the sequence of blocks with a second information entity, wherein the unit for forming is designed to start the first hypothesis or continue the already existing first hypothesis in response to the first identification result and to start the second hypothesis or to continue the already existing second hypothesis in response to the second identification result;

a unit for examining the at least two hypotheses by combining the reliability measures of the hypotheses to obtain an examination result; and a unit for making a statement on the information signal based on the examination result.

2. The device of claim 1, wherein the unit for examining is designed to examine the hypotheses with respect to probability information applying to the hypotheses.

3. The device of claim 1, wherein the unit for making a statement is designed to determine that the sequence of blocks represents an information entity having a hypothesis that is most likely, or that an information entity ends with the fingerprint that contributes to the most likely hypothesis as the last one in time, or that an information entity is present in the information signal or not.

4. The device of claim 1, wherein the unit for providing is designed to generate two different identification results for a fingerprint.

5. The device of claim 4, wherein the unit for providing is designed to generate a reliability measure for each one of the two different identification results.

6. The device of claim 4, wherein the unit for forming is designed to associate a first one of the two identification results with the first hypothesis and to associate a second one of the two identification results with the second hypothesis.

7. The device of claim 3, wherein the unit for examining is designed to determine the hypothesis that has a higher combined reliability measure.

8. The device of claim 1, wherein the unit for forming is designed to end the first or second hypotheses when a predetermined number of blocks will neither obtain an identification result indicating the first information entity nor an identification result indicating the second information entity.

9. The device of claim 1, wherein the unit for forming is designed to end the first or second hypotheses when a detected event occurs in the information signal.

10. The device of claim 9, wherein there is an event detector, which is designed to detect an energy level in a block of information units that is below a threshold level as the event.

11. The device of claim 1, wherein the unit for providing is designed to output only the most reliable identification result without or with reliability measure for each fingerprint, to output a predetermined number of most reliable fingerprints, each with or without reliability measure, for a fingerprint, or to output only the identification results having a reliability measure above a threshold with or without reliability measures for a fingerprint.

12. The device of claim 1, wherein the unit for examining is designed to add explicit or implicit reliability measures belonging to a hypothesis to obtain a combined reliability measure.

13. The device of claim 1, wherein the unit for providing is designed to perform a search in a database, in which fingerprints of reference information entities are stored, with a fingerprint, and to provide a number of identification results and a distance measure for each identification result as indication of a reliability measure for each identification result.

14. The device of claim 13, wherein the unit for providing is designed to start a new hypothesis for each identification result for which there is no hypothesis yet, when a distance measure for the identification result has a relationship to a threshold indicating a smaller distance than a threshold distance.

15. The device of claim 1, wherein the unit for examining is designed to end, in response to a determination, all hypotheses for the consecutive fingerprints that have been formed for the fingerprints that are covered by the most likely hypothesis.

16. The device of claim 1, wherein the information signal includes an audio signal, wherein the information unit are audio samples in the time or frequency domain, and wherein an information entity includes a piece of music, a spoken sequence or a noise portion.

17. The device of claim 1, wherein a fingerprint for a block is determined by a time/frequency conversion and/or by calculation of a spectral flatness measure for a result of the time/frequency conversion.

18. The device of claim 1, wherein a fingerprint for a block is generated so that the fingerprint has an amount of data that is smaller than an amount of data of the block.

19. The device of claim 1, wherein the unit for providing identification results is designed to provide, in addition to an identification result, also a new time index for the identification result, and wherein the unit for forming hypotheses is designed to continue a hypothesis if there is a continuity between a most current time index in the hypothesis and the new time index, or to start a hypothesis if there is no continuity.

20. A method for analyzing an information signal having a sequence of blocks of information units, wherein a plurality of consecutive blocks of the sequence of blocks represents an information entity, using a sequence of fingerprints for the sequence of blocks so that the sequence of blocks is represented by the sequence of fingerprints, comprising:

providing identification results for consecutive fingerprints, wherein an identification result represents an association of a block of information units with a predetermined information entity, and wherein there is a reliability measure for each identification result, wherein, in the step of providing, a first identification result is generated for a first fingerprint and a second identification result differing from the first identification result is generated for a following block;

forming at least two hypotheses from the identification results for the consecutive fingerprints, wherein a first hypothesis is an assumption for the association of the sequence of blocks with a first information entity, and wherein the second hypothesis is an assumption for an association of the sequence of blocks with a second information entity, wherein the step of forming comprises:

starting the first hypothesis or continuing the already existing first hypothesis in response to the first identification result, and starting the second hypothesis or continuing the already existing second hypothesis in response to the second identification result;

examining the at least two hypotheses by combining the reliability measures of the hypotheses to obtain an examination result; and making a statement on the information signal based on the examination result.

21. A computer program having a program code for performing a method, when the program runs on a computer, for analyzing an information signal having a sequence of blocks of information units, wherein a plurality of consecutive blocks of the sequence of blocks represents an information entity, using a sequence of fingerprints for the sequence of blocks so that the sequence of blocks is represented by the sequence of fingerprints, comprising providing identification results for consecutive fingerprints, wherein an identification result represents an association of a block of information units with a predetermined information entity, and wherein there is a reliability measure for each identification result, wherein, in the step of providing, a first identification result is generated for a first fingerprint and a second identification result differing from the first identification result is generated for a following block; forming at least two hypotheses from the identification results for the consecutive fingerprints, wherein a first hypothesis is an assumption for the association of the sequence of blocks with a first information entity, and wherein the second hypothesis is an assumption for an association of the sequence of blocks with a second information entity, wherein the step of forming comprises starting the first hypothesis or continuing the already existing first hypothesis in response to the first identification result, and starting the second hypothesis or continuing the already existing second hypothesis in response to the second identification result; examining the at least two hypotheses by combining the reliability measures of the hypotheses to obtain an examination result; and making a statement on the information signal based on the examination result.

* * * * *